(12) United States Patent
Dammrose

(10) Patent No.: US 8,554,172 B2
(45) Date of Patent: Oct. 8, 2013

(54) USING ELECTRONIC SURVEILLANCE DATA AS EVENT TRIGGERS FOR LAWFUL LOCATION TRACKING

(75) Inventor: John Mark Dammrose, Bothell, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 671 days.

(21) Appl. No.: 12/255,368

(22) Filed: Oct. 21, 2008

(65) Prior Publication Data

US 2010/0099436 A1    Apr. 22, 2010

(51) Int. Cl.
*H04M 11/04*    (2006.01)
(52) U.S. Cl.
USPC .............. 455/404.2; 455/414.1; 455/456.1; 455/456.2; 455/456.3; 455/456.5
(58) Field of Classification Search
USPC ............ 455/40.1, 404.2, 410, 414.1, 414.2, 455/404.1, 456.1–456.6
See application file for complete search history.

(56) References Cited

U.S. PATENT DOCUMENTS

| | | | |
|---|---|---|---|
| 2002/0009973 A1* | 1/2002 | Bondy et al. | 455/67.2 |
| 2004/0203849 A1* | 10/2004 | Allison et al. | 455/456.1 |
| 2005/0003797 A1* | 1/2005 | Baldwin | 455/404.1 |
| 2005/0186948 A1* | 8/2005 | Gallagher et al. | 455/414.1 |
| 2006/0172743 A1* | 8/2006 | Murhammer et al. | 455/456.1 |
| 2006/0217136 A1* | 9/2006 | Bantukul et al. | 455/466 |
| 2007/0004378 A1* | 1/2007 | Muhonen | 455/404.2 |
| 2009/0181698 A1* | 7/2009 | Farmer et al. | 455/456.3 |

* cited by examiner

*Primary Examiner* — Charles Appiah
*Assistant Examiner* — Jaime Holliday
(74) *Attorney, Agent, or Firm* — Parks IP Law LLC; Li K. Wang, Esq.

(57) ABSTRACT

A system and method to automatically provide a location estimate of a mobile station in communication with a mobile wireless network to an appropriate law enforcement agency in response to detecting an electronic surveillance event within a mobile wireless network. A surveillance location server extracts pertinent information from a surveillance event message and sends a request for a location estimate to network components that generate and return the location estimate. The surveillance location server forwards to the location estimate to an appropriate law enforcement agency.

18 Claims, 2 Drawing Sheets

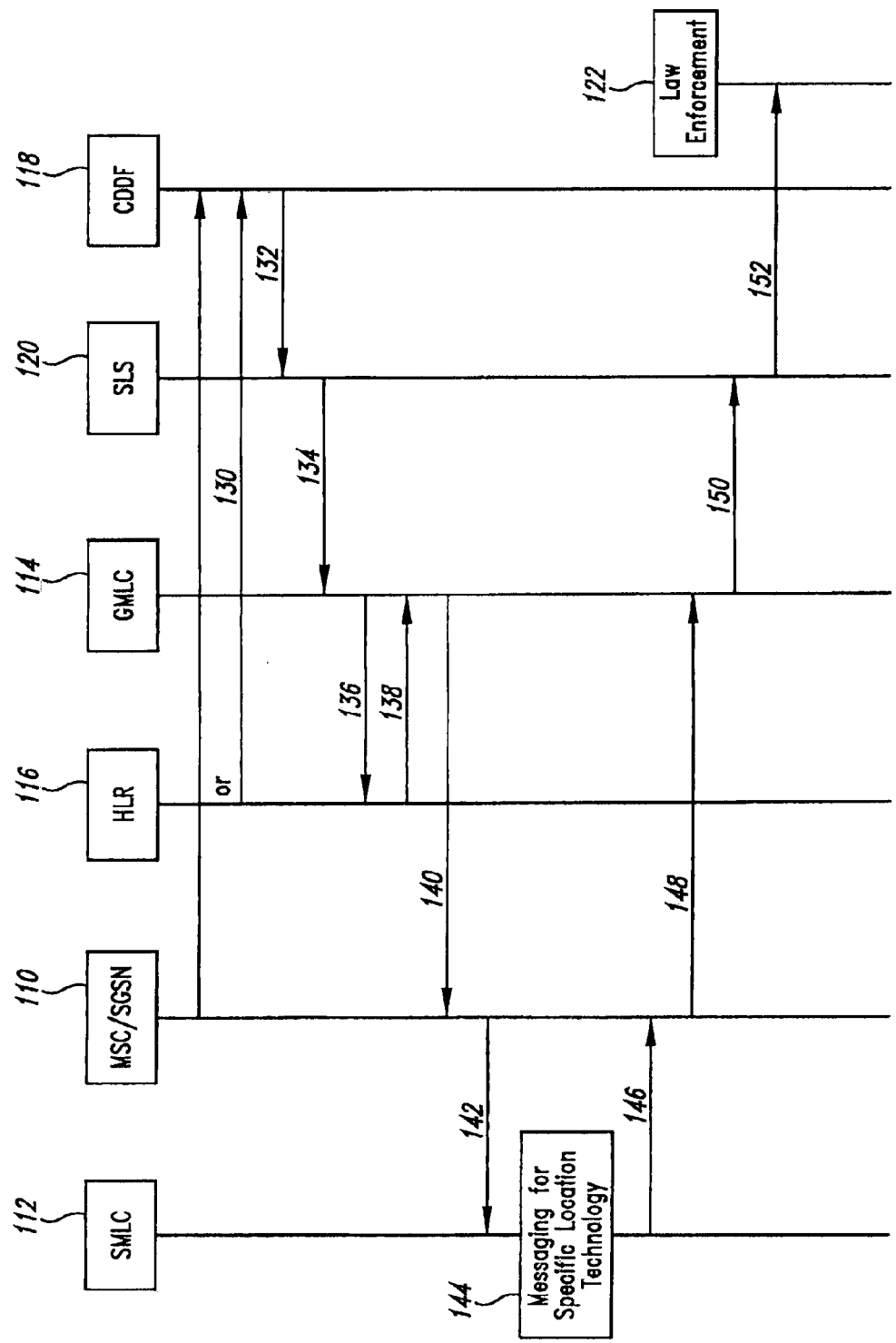

USING ELECTRONIC SURVEILLANCE DATA AS EVENT TRIGGERS FOR LAWFUL LOCATION TRACKING

BACKGROUND OF THE INVENTION

1. Field of the Invention

The present invention is directed generally to estimating a geographical location of a mobile station connected to a mobile wireless network. Specifically, the present invention is directed to using electronic surveillance events detected in the mobile wireless network to automatically generate a location estimate of a mobile station associated with the surveillance event and to automatically provide the location estimate to an appropriate law enforcement agency.

2. Description of the Related Art

Most mobile wireless networks today are equipped with enhanced emergency services (E911) resources that automatically provide emergency service providers with the location of a mobile station making an emergency call to 911. Some mobile wireless networks provide non-emergency Location Based Services (LBS) that use the same or similar resources as the E911 resources.

In the course of performing surveillance on a particular mobile station, law enforcement agencies sometimes need to determine the location of the mobile stations. Most mobile wireless networks today can automatically provide law enforcement agencies the identity of the serving cell sector at the beginning and end of a call as part of compliance with the Communications Assistance for Law Enforcement Act of 1994 (CALEA). Some mobile wireless networks today can also provide time-based interval tracking to generate automated location estimates of particular mobile stations. For example, a wireless network may be configured to request location update of a particular mobile station every fifteen minutes and send that location estimate to the law enforcement agency that requested it. However, in some situations the targeted mobile station is only powered on for very short periods of time. In other cases a law enforcement agency may want to correlate the location of a mobile station to particular activities (e.g., registering the mobile station with the network during powering up the mobile station, originating a call, sending a text message, or accessing a website, etc.). For example, a law enforcement agency may be confronted with a kidnapper who only activates a prepaid mobile on the network for thirty seconds to call in ransom demands and then removes the battery. Current methods are inadequate for these needs.

BRIEF DESCRIPTION OF THE SEVERAL VIEWS OF THE DRAWINGS

FIG. 2 shows the signaling flow for event based location surveillance in the mobile network of FIG. 1.

DETAILED DESCRIPTION OF THE INVENTION

Figure 1:
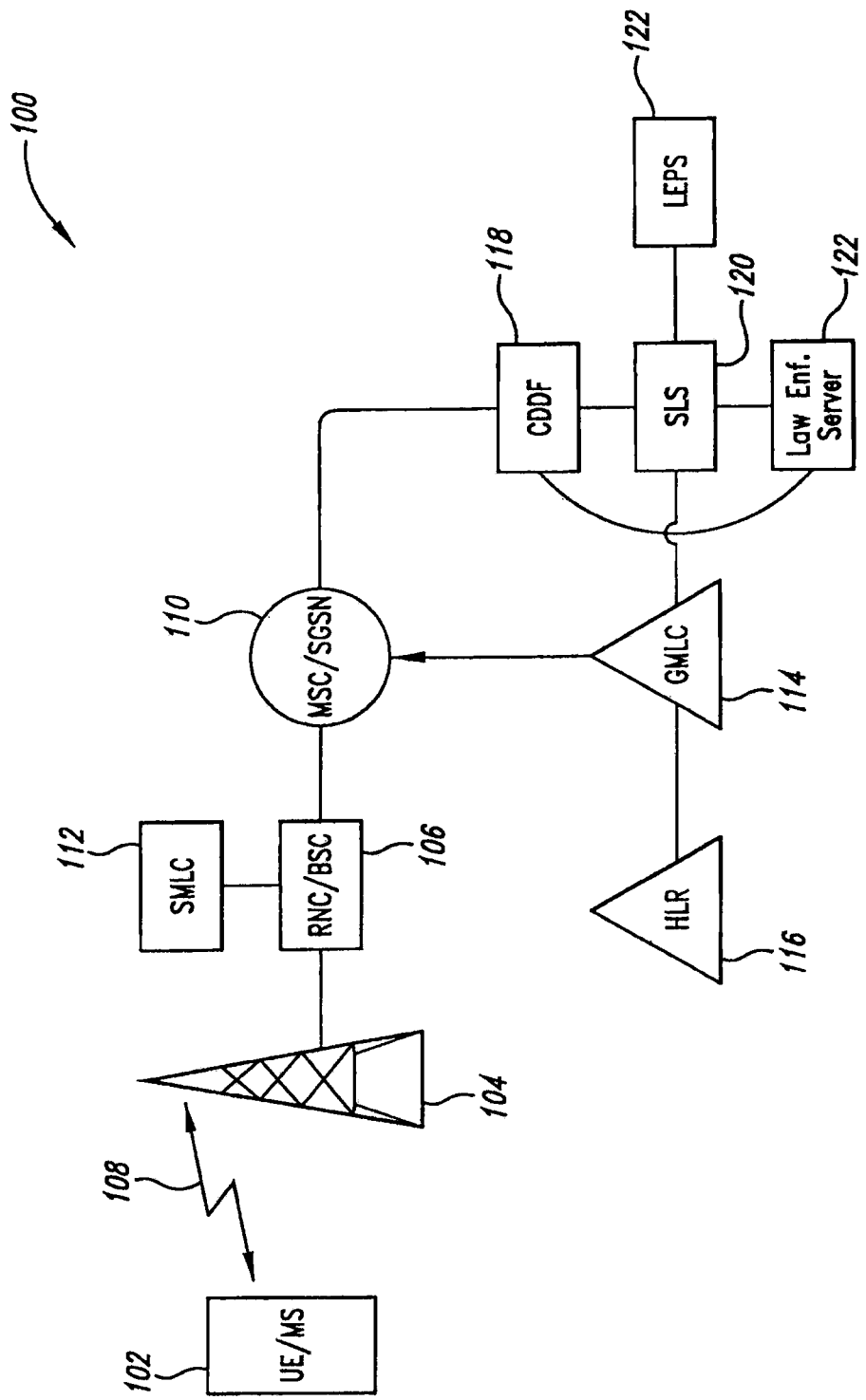
FIG. 1 show the network architecture for a mobile wireless network configured to perform lawful location tracking.

FIG. 1 shows the network architecture for a mobile wireless network 100 configured to perform lawful location tracking. In some embodiments, the mobile wireless network 100 conforms to standards related to the second generation Global System for Mobile communications (GSM), or conforms to standards related to the third generation Universal Mobile Telecommunications System (UMTS) or conforms to another standard. In some embodiments, the mobile wireless network 100 does not completely conform to any standard. The mobile wireless network 100 provides wireless services to one or more mobile stations 102, including circuit switched services (traditional voice services) and packet-switched services (data services). The mobile wireless network 100 includes a base station 104 and a Base Station Controller (BSC) 106 (Radio Network Controller (RNC) in UMTS) that provide a wireless communication channel 108 between the mobile wireless network 100 and the mobile station 102.

The mobile wireless network 100 includes an edge switch 110 that routes traffic between the base station controller 106 and the remainder of the mobile wireless network 100. An example of an edge switch for circuit switched traffic would be a Mobile Switching Center (MSC). An example of an edge switch 110 for packet-switched traffic is a Serving GPRS Service Node (SGSN). The primary function of the edge switch 110 is to route traffic. Additionally, the edge switch 110 can identify certain events that it participates in as surveillance events. Such events may include registering the mobile station 102 with the mobile wireless network 100 and placing a call from the mobile station 102. The edge switch 110 is provisioned with information necessary to identify specific events involving specific mobile stations as surveillance events. Typically, the edge switch 110 is provisioned by a remote network element specializing in the task of provisioning surveillance events. Alternatively, the edge switch 110 may be provisioned directly by a network technician. The edge switch 110 is configured to generate surveillance event messages if the edge switch detects an event that the edge switch 110 has been provisioned to identify as a surveillance event.

Even though FIG. 1 only shows a single mobile station 102, base station 104, base station controller 106, and edge switch 110, persons of skill in the art will understand that multiple mobile stations 102 may connect to a single base station 104, multiple base stations may connect to a single base station controller 106, multiple base station controllers may connect to a single edge switch 110 and multiple edge switches 110 may exist in the mobile wireless network 100.

The mobile wireless network 100 includes a Serving Mobile Location Center (SMLC) 112. The SMLC 112 is a network element that manages the overall coordination and scheduling of resources required to estimate the location of the mobile station 102. In some embodiments, the SMLC 112 is configured to use multiple resources and multiple methods to generate multiple location estimates, which the SMLC 112 combines in a combined location estimate. The SMLC 112 is configured to predict an accuracy of the location estimate. Typically, there is more than one SMLC 112 in the mobile wireless network 100. The SMLC 112 is logically connected with the base station controller 106. In some embodiments, the SMLC 112 is physically located in a separate network element. In other embodiments, the SMLC 112 is physically located in the same network element as the BSC 106. The SMLC 112 receives location requests from the edge switch 110. T one present in an area The mobile wireless network 100 includes a Gateway Mobile Location Center (GMLC) 114. The GMLC 114 is a specialized service control point (SCP) that supports location-based applications or services. The GMLC 114 is configured to receive a request for a location estimate of a mobile station 102. The GMLC 114 is configured to generate requests for estimates of locations of mobile stations 102.

The mobile wireless network 100 includes a Home Location Register (HLR) 116. The HLR 116 is a specialized Service Control Point (SCP) that stores details of one or more mobile stations 102 authorized to use the mobile wireless network 100. The HLR 116 is configured to provide an identity of an edge switch that last served a particular mobile station 102. The HLR 116 can also be provisioned to identify certain events that it participates in as surveillance events and generate surveillance event messages accordingly. Such events could include registering the mobile station 102 with the mobile wireless network 100. Typically, there is one or more logical HLR 116 in the mobile wireless network 100, although it may be located on multiple physical platforms. The HLR 116 is logically connected to the GMLC 114.

The mobile wireless network 100 includes a Call Data Delivery Function (CDDF) 118 that is configured to receive surveillance event messages from various network elements in the mobile wireless network 100. The CDDF is provisioned in advance with instructions on how to handle surveillance event messages. The instructions handling for a particular surveillance event may depend on the nature of the event and the identity of any mobile station 102 involved in the event. The CDDF 118 is configured to distribute, in accordance with its provisioning instructions, the appropriate surveillance event messages to other elements in the mobile wireless network 100 or to law enforcement collection facilities outside the mobile wireless network 100, such as an exemplary law enforcement server 122 in FIG. 1.

The mobile wireless network 100 includes a Surveillance Location Server (SLS) 120 that is configured to generate location requests. The SLS 120 may be configured to issue periodic location requests or configured to issue event driven location requests based on receipt of surveillance event messages. In some embodiments the surveillance event messages conform to the Lawfully Authorized Electronic Surveillance Protocol (LAESP) defined in J-STD-025 for delivering call identifying information to law enforcement. The SLS 120 is logically linked to the GMLC 114 and logically linked to the CDDF 118. The SLS 120 is configured for secure collection, temporary storage, and distribution of lawfully authorized location data. In some embodiments, the logical link between the SLS 120 and the GMLC 114 conforms to the Open Mobile Alliance (OMA) Mobile Location Protocol (MLP). The SLS 120 is logically linked to the law enforcement server 122. In some embodiments, the SLS 120 communicates with the law enforcement server 122 via Simple Mail Transfer Protocol (SMTP). In some embodiments, the SLS 120 is physically located in its own network element. In other embodiments, the SLS 120 is physically located in the same network element as the GMLC 114. And yet other embodiments, the SLS 120 is located in the same network element as the CDDF 118.

The mobile wireless network 100 includes a Law Enforcement Provisioning Server (LEPS) 122. The LEPS 122 is logically connected to the SLS 120 as shown in FIG. 1, and logically connected to other network elements such as the CDDF 118, the edge switch 110 and HLR 116 (connections not shown in FIG. 1 for simplicity). The LEPS 122 provides provisioning functions to the SLS 120, the CDDF 118, the edge switch 110 and other network elements in the mobile wireless network 100.

FIG. 2 shows the signaling flow for event based location surveillance in the mobile wireless network 100 of FIG. 1. In step 130, upon detection of a surveillance event by one of the network elements in the mobile wireless network 100, the network element sends a surveillance event message 130 to the CDDF 118. Typically, the network element that sends the surveillance message 130 is the edge switch 110 or the home location register (HLR) 116. These network elements can be provisioned, typically by the LEPS 122, to monitor for specific events to identify as surveillance events that trigger generating surveillance event messages. Any interaction between the mobile station 102 and the mobile wireless network 100 in which the mobile wireless network 100 is able to identify the mobile station 102 can be provisioned to trigger a surveillance message. Events that can be provisioned to trigger a surveillance message may include, but are not limited to, the mobile station 102 registering with the mobile wireless network 100, a voice call originating from the mobile station 102, a text message originating from the mobile station 102, a base station handoff involving the mobile station 102, and a website access from the mobile station 102.

In step 132, the CDDF 118 forwards the surveillance event message. For example, the CDDF 118 makes a decision on where to forward the surveillance event message based the instructions that have been provisioned into the CDDF 118. The CDDF 118 may forward the surveillance event message to various law enforcement servers 122 if its provision instructions so indicate. The CDDF 118 forwards surveillance event message to the SLS 120 if its provisioned instructions indicate that the surveillance event and mobile station identifier information indicate that it should.

In step 134, the SLS 120 sends to the GMLC 114 a request for an estimate of a location of the mobile station 102 that generated the surveillance event. Upon receiving the surveillance event message, the SLS 120 extracts the pertinent information from the surveillance event message, such as information identifying the mobile station 102 that generated the surveillance event, information such as the mobile directory number (MDN), or international mobile system identity (IMSI). Persons of skill in the art will realize that any information that identifies the mobile station 102 and is recognized by both the GMLC 114 and the CDDF 118 can be used to generate the location estimate request. The SLS 120 uses the information extracted from the surveillance event message to generate the location estimate request. The location estimate request bypasses any privacy notification to the targeted mobile station 102. In some embodiments, the location estimate request is sent in a Standard Location Immediate Request message. In other embodiments, the location estimate request is sent in an Emergency Location Immediate Request (ELIR).

In step 136, the GMLC 114 sends a request to the HLR 116 for an identity of a last known edge switch 110 serving the identified mobile station 102. In some embodiments, the GMLC 114 uses standard location services (LCS) control plane signaling to perform this step. In some embodiments, the request for the identity of the last known edge switch serving the identified mobile station 102 is sent in a Send Routing Information for LoCation Services (SRI_LCS) message.

In step 138, upon receiving the request, the HLR 116 returns the identity of the last known edge switch 110 serving the identified mobile station 102 to the GMLC 114. In some embodiments, the HLR 116 returns the identity of the last known edge switch 110 serving the identified mobile station 102 in a SRI_LCS response message.

In step 140, upon receiving the edge switch identity, the GMLC 114 sends a request to the identified edge switch 110 to generate a location estimate for the mobile station 102. In some embodiments, the GMLC 114 sends the request to the identified edge switch 110 in a Provide Subscriber Location (PSL) message.

In step 142, upon receiving the request to generate a location estimate for the mobile station 102, the edge switch 110 sends a perform location request to the SMLC 112. In some embodiments the perform location request is sent in a Perform Location Request message. Intermediate elements, such as the BSC 106 may forward the perform location request. In some embodiments, the edge switch 110 may also page the mobile station 102, in order to ensure an active signal from the mobile station 102 that network resources can use to estimate the location of the mobile station 102.

In step 144, the SMLC 112 generates a location estimate for the mobile station 102. The SMLC 122 performs additional messaging and signaling specific to a location technology used in the part of the mobile wireless network covered by the SMLC 112. Several technologies that may be used include time difference of arrival, differential time of arrival, assisted global positioning system, and enhanced cell ID. The process at step 144 is not limited to a specific location estimation technology.

In step 146, the SMLC 112 sends the location estimate back to the edge switch 110. In some embodiments, the SMLC 112 sends the location estimate back to the edge switch 110 in a Perform Location Request Response (PLR-R) message.

In step 148, the edge switch 110 transfers the location estimate to the GMLC 114. In some embodiments, the edge switch 110 transfers the location estimate to the GMLC 114 in a Provide Subscriber Location Request Response (PSLR-R) message.

In step 150, the GMLC 114 transfers the location estimate to the SLS 120. In some embodiments, the GMLC 114 transfers the location estimate to the SLS 120 in a Standard Location Immediate Answer (SLIA) message.

In step 152, upon receipt of the location estimate, the SLS 120 distributes the location estimate according to its provisioning instructions. The SLS 120 provisioning instructions may require the SLS 120 to distribute the location estimate to one or more law enforcement servers 122 in an Event Location Estimate Message (SELEM), as shown in FIG. 1. The SLS 120 provisioning instructions may require the SLS 120 to store the location estimate for secure retrieval at a later time.

The system and method described above can quickly and automatically provide event-triggered location estimates to law enforcement agencies.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method, implemented in a mobile wireless network to provide an estimate of a location of a mobile station to an authorized agency, comprising:

detecting, at a network element, a surveillance event in the mobile wireless network, wherein the surveillance event comprises a non-telephone-call-related event selected from a group of events consisting of:

(i) a text message originating at the mobile station;

(ii) a text message being directed to the mobile station; and (iii) the mobile station accessing a web site;

sending, from the network element, in response to detecting the surveillance event, a surveillance event message to a call data delivery function, the surveillance event message comprising identifying information related to the mobile station;

determining, by the call data delivery function, a selected surveillance location server from a plurality of surveillance location servers to which the surveillance event message is forwarded;

sending, from the call data delivery function, the surveillance event message to the selected surveillance location server;

extracting, at the selected surveillance location server, upon receipt of the surveillance event message, the identifying information from the surveillance event message;

receiving, at a gateway mobile location center, from the selected surveillance location server, a location estimate request prepared by the surveillance location server based on the identifying information;

obtaining, at the gateway mobile location center, an identity of a last known edge switch serving the mobile station;

sending, from the gateway mobile location center, the location estimate request for the mobile station to the last known edge switch serving the mobile station;

paging, by the last known edge switch and in response to receiving the location estimate request by the last known edge switch, the mobile station to obtain an active signal from the mobile station;

obtaining, by the last known edge switch, a location estimate using the active signal received from the mobile station;

receiving, at the gateway mobile location center, the location estimate from the last known edge switch serving the mobile station;

predicting, by the gateway mobile location center, an accuracy of the location estimate;

sending, from the gateway mobile location center, the location estimate and information indicating the accuracy of the location estimate to the selected surveillance location server; and sending, from the selected surveillance location server, the location estimate to the authorized agency.

2. The method of claim 1, wherein extracting identifying information from the surveillance event message further comprises extracting a mobile directory number or an international mobile system identity from the surveillance event message.

3. The method of claim 1, wherein sending the location estimate request further comprises sending a standard location immediate request or an emergency location immediate request.

4. The method of claim 1, wherein detecting the surveillance event further comprises detecting a particular interaction between the mobile wireless network and the mobile station, wherein the particular interaction has been previously identified in the mobile wireless network as a surveillance event.

5. The method of claim 1, wherein detecting the surveillance event in the mobile wireless network further comprises detecting the surveillance event in the mobile wireless network at a device selected from a group of devices consisting of a mobile switching center and a home location register.

6. The method of claim 1, wherein sending the surveillance event message to the call data delivery function further comprises sending the surveillance event message to the call data delivery function at a device selected from a group of devices consisting of a mobile switching center and a home location register.

7. The method of claim 1, wherein sending, from the surveillance location server, the location estimate to the authorized agency further comprises sending, from the selected surveillance location server, the location estimate to a law enforcement agency.

8. A system, for estimating a location of a mobile station implemented by a mobile wireless network, comprising:
a network element in the mobile wireless network configured to detect a surveillance event and send a surveillance event message in response to detecting the surveillance event, wherein the surveillance event comprises an event selected from a group of non-telephone-call-related events consisting of:
(i) a text message originating at the mobile station;
(ii) a text message being directed to the mobile station; and
(iii) the mobile station accessing a web site;
the surveillance event message comprises identifying information related to the mobile station;
a call data delivery function configured to receive surveillance event messages from a plurality of network elements and forward the surveillance event messages to a surveillance location server selected from a plurality of destinations according to the nature of the surveillance event and the identity of the mobile station;
the surveillance location server configured to, upon receipt of the surveillance event message, extract the identifying information from the surveillance event message, send a location estimate request based on the extracted identifying information to a gateway mobile location center, and forward a location estimate received from the gateway mobile location center to an authorized agency; and
the gateway mobile location center configured to, upon receipt of the location estimate request, cause paging of the mobile station, obtain a location estimate based on the extracted identifying information and an active signal in response to the paging of the mobile station, predict an accuracy of the location estimate, and forward the location estimate and information indicating the accuracy of the location estimate to the surveillance location server.

9. The system of claim 8, wherein the surveillance location server is further configured to extract identifying information, which is selected from a group consisting of a mobile directory number and an international mobile system identity, from the surveillance event message.

10. The system of claim 8, wherein the surveillance location server is further configured to send a standard location immediate request.

11. The system of claim 8, wherein the network element is further configured to detect a particular interaction between the mobile wireless network and the mobile station, wherein the particular interaction has been previously identified to the network element as a surveillance event.

12. The system of claim 8, wherein the network element is further configured to detect one of registering mobile stations, originating a call from the mobile station, sending a text message from the mobile station and accessing a web site from the mobile station.

13. The system of claim 8, wherein the network element further comprises a mobile switching center.

14. A method, for a surveillance location server in a mobile wireless network to estimate a location of a mobile station, comprising:
extracting identifying information associated with the mobile station from the surveillance event message, upon receipt of a surveillance event message in response to detection of a surveillance event by the mobile wireless network, the surveillance event comprises an event selected from a group of non-telephone-call-related events consisting of:
(i) a text message originating at the mobile station;
(ii) a text message being directed to the mobile station; and
(iii) the mobile station accessing a web site;
generating a location estimate request based on the identifying information extracted from the surveillance event message;
sending location estimate request to a gateway mobile location center;
receiving a location estimate, calculated using an active signal resulting from a last known edge switch paging the mobile station, with information indicating the accuracy of the location estimate from the gateway mobile location center, wherein the gateway mobile location center predicted the accuracy of the location estimate;
and sending the location estimate to the authorized agency.

15. The method of claim 14, wherein receiving a surveillance event message further comprises receiving a surveillance event message from a call data delivery function.

16. The method of claim 14, wherein extracting identifying information from the surveillance event message further comprises extracting identifying information, which is selected from a group consisting of a mobile directory number and an international mobile system identity, from the surveillance event message.

17. The method of claim 14, wherein sending the location estimate request further comprises sending a standard location immediate request message.

18. A non-transitory computer readable storage media encoded with instructions that, when executed by a network processing element of a mobile wireless network, causes the processing element to perform operations, to estimate a location of a mobile station, comprising:

extracting identifying information associated with the mobile station from the surveillance event message, upon receipt of a surveillance event message, in response to detecting a surveillance event, related to the mobile station, the surveillance event comprises an event selected from a group of non-telephone-call-related events consisting of:
(i) a text message originating at the mobile station;
(ii) a text message being directed to the mobile station; and
(iii) the mobile station accessing a web site;

generating a location estimate request based on the identifying information extracted from the surveillance event message;

sending a location estimate request to a gateway mobile location center;

receiving a location estimate, calculated using an active signal resulting from a last known edge switch paging the mobile station, with information indicating the accuracy of the location estimate from the gateway mobile location center, wherein the gateway mobile location center predicted the accuracy of the location estimate; and sending the location estimate to the authorized agency.

* * * * *